United States Patent [19]

Maeda et al.

[11] Patent Number: 4,512,604
[45] Date of Patent: Apr. 23, 1985

[54] VEHICULAR SEAT ARRANGEMENT

[75] Inventors: Kouzo Maeda; Harutoshi Tsujimura, both of Yokosuka, Japan

[73] Assignee: Nissan Motor Company, Limited, Yokohama, Japan

[21] Appl. No.: 366,218

[22] Filed: Apr. 7, 1982

[30] Foreign Application Priority Data

Apr. 20, 1981 [JP] Japan .............................. 56-57349[U]

[51] Int. Cl.³ .............................................. B60N 1/02
[52] U.S. Cl. .................................. 296/65 A; 297/216; 280/748
[58] Field of Search ...................... 296/63, 65 R, 65 A, 296/188, 189, 30; 280/748; 297/216, 320, 343; 244/122 R

[56] References Cited

U.S. PATENT DOCUMENTS

| | | | |
|---|---|---|---|
| 2,872,241 | 2/1959 | Sheldon | 296/146 |
| 3,357,736 | 12/1967 | McCarthy | 296/65 A |
| 3,885,810 | 5/1975 | Chika | 296/65 A |
| 4,231,607 | 11/1980 | Bohlin | 296/63 |

Primary Examiner—Robert B. Reeves
Assistant Examiner—Dennis H. Pedder
Attorney, Agent, or Firm—Lane, Aitken & Kananen

[57] ABSTRACT

A vehicular seat arrangement for use in an automotive vehicle, comprising at least two seat assemblies positioned on the floor panel in parallel with each other laterally of the vehicle body, each seat assembly having a seat cushion portion and a seat back portion upstanding from the seat cushion portion and rockable with respect to the seat cushion portion about a pivot axis in a lateral direction of the seat assembly, a seat reinforcing device including an elongated reinforcement member extending in a lateral direction of the vehicle body between the side wall portions of the vehicle body and passed in part through the seat back portion of one of the seat assemblies and in part through the seat back portion of the other of the seat assemblies, and tilt regulating means permitting the seat back portion of one of the seat assemblies to tilt with respect to the seat cushion portion of the seat assembly about the pivot axis independently of the seat back portion of the other of the seat assemblies.

18 Claims, 19 Drawing Figures

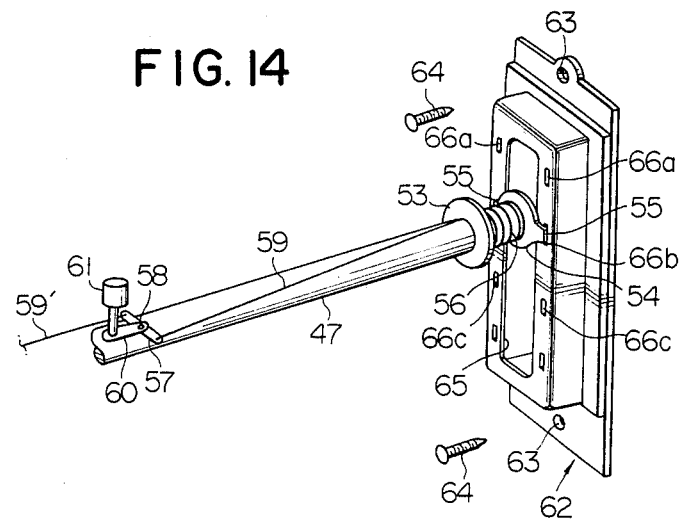
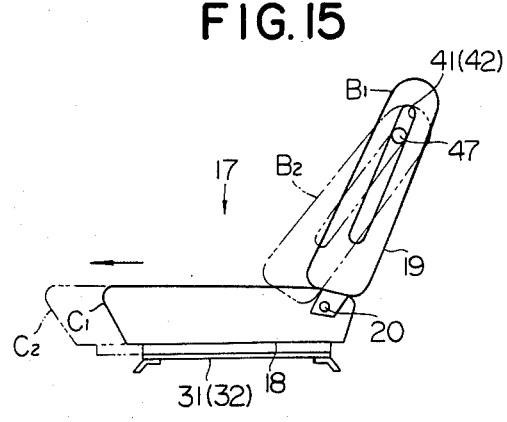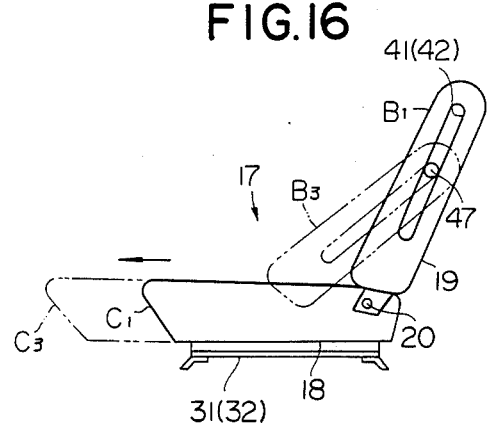

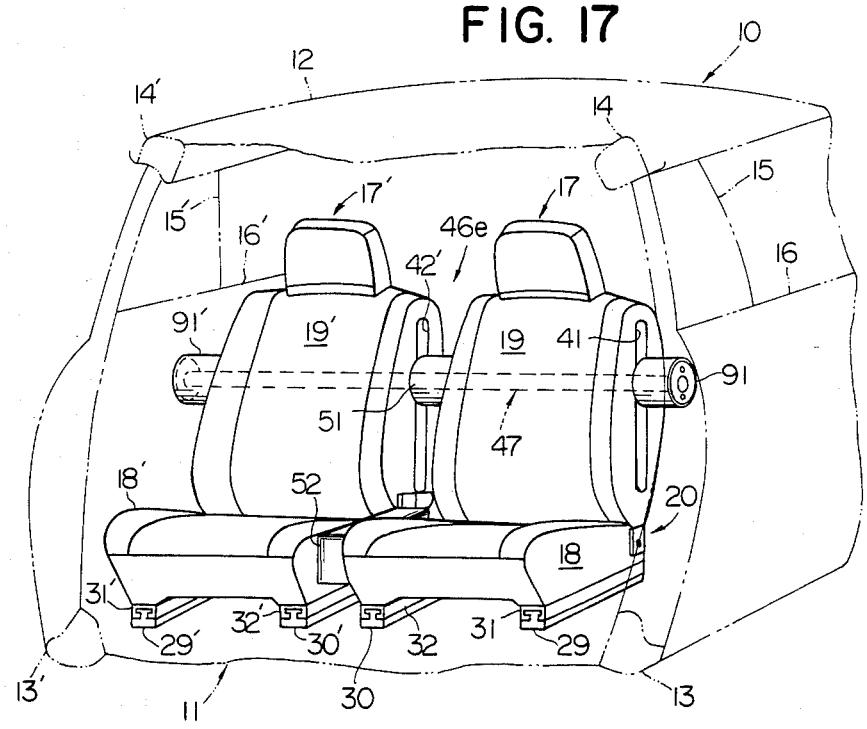

4,512,604

VEHICULAR SEAT ARRANGEMENT

FIELD OF THE INVENTION

The present invention relates to a seat arrangement for use in an automotive vehicle in which at least two seat assemblies are positioned side by side between side wall portions or side door structures of the vehicle body and in which at least one of the seat assemblies has a seat back portion tiltable with respect to the seat cushion portion of the seat assembly.

SUMMARY OF THE INVENTION

In accordance with the present invention, there is provided a vehicular seat arrangement for use in an automotive vehicle having a vehicle body including a floor panel and a pair of side wall portions, comprising at least two seat assemblies positioned on the floor panel in parallel with each other laterally of the vehicle body, each of the seat assemblies having a seat cushion portion positioned over and substantially in parallel to the floor panel and a seat back portion upstanding from the seat cushion portion and rockable with respect to the seat cushion portion about a pivot axis in a lateral direction of the seat assembly, a seat reinforcing device including an elongated reinforcement member longitudinally extending in a lateral direction of the vehicle body between the side wall portions and passed in part through the seat back portion of one of the seat assemblies and in part through the seat back portion of the other of the seat assemblies, and tilt regulating means permitting the seat back portion of one of the seat assemblies to tilt with respect to the seat cushion portion of the seat assembly about the pivot axis independently of the seat back portion of the other of the seat assemblies.

BRIEF DESCRIPTION OF THE DRAWINGS

The features and advantages of the vehicular seat arrangement according to the present invention will be more clearly understood from the following description in which like reference numerals and characters designate corresponding or similar members and structures throughout the figures of the drawings and in which:

FIG. 14 is a fragmentary perspective view also showing portions of the locking means illustrated in FIG. 12;

FIG. 15 is a side elevation view of each of the seat assemblies in the second preferred embodiment of a vehicular seat arrangement according to the present invention as shown in FIGS. 10 to 14, the seat assembly being shown having its seat cushion and back portions in different angular positions;

FIG. 16 is a view similar to FIG. 15 but shows the seat assembly having its seat cushion and back portions in further different angular positions;

FIGS. 17, 18 and 19 are perspective views showing third, fourth and fifth preferred embodiments, respectively, of a vehicular seat arrangement according to the present invention.

DESCRIPTION OF THE PRIOR ART

Figure 1:
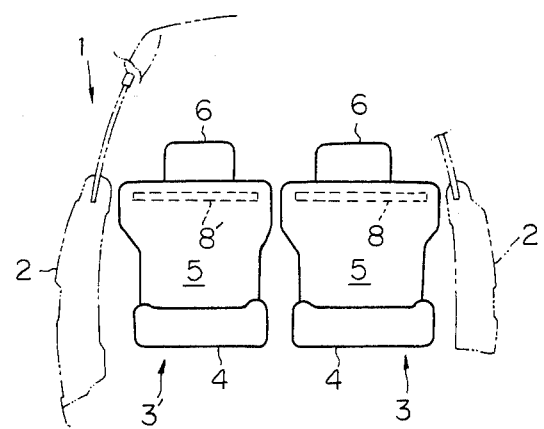
FIG. 1 is a front view schematically showing a prior-art vehicular seat arrangement for use in an automotive vehicle.
Figure 2:
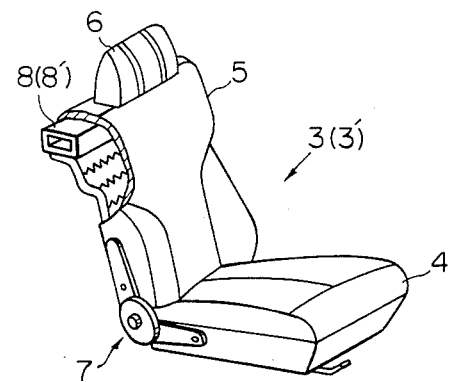
FIG. 2 is a partially cut-away perspective view of each of the seat assemblies included in the prior-art vehicular seat arrangement shown in FIG. 1.

FIG. 1 of the drawings shows a prior-art seat arrangement of the nature to which the present invention generally appertains. The seat arrangement herein shown is disclosed in Japanese Utility Model Publication No. 55-8668 and is provided in an automotive vehicle having a vehicle body 1. The vehicle body 1 is shown having side door structures 2 and 2'. The prior-art seat arrangement includes a pair of seat assemblies 3 and 3' which are positioned side by side laterally of the vehicle body 1, viz., between the side door structures 2 and 2' of the vehicle body 1. As shown in FIG. 2, each of the seat assemblies 3 and 3' has a seat cushion portion 4 and a seat back portion 5 upstanding from the rear end of the seat cushion portion 4 and having a head rest pad 6 at the upper end thereof. The seat back portion 5 of each seat assembly is pivotally connected adjacent the lower end thereof to the rear end of the seat cushion portion 4 by an adjustable pivot unit 7 permitting the seat back portion 5 to tilt forwardly and backwardly. The pivot units 7 respectively provided for the two seat assemblies 3 and 3' are adapted to be manipulated independently of each other so that the seat back portion 5 of each of the seat assembly can be tilted between an upright normal position and a downwardly inclined position independently of the seat back portion of the other seat assembly.

The seat assemblies 3 and 3' have elongated rigid reinforcement members 8 and 8', respectively, provided in the seat back portions 5 thereof. The rigid reinforcement members 8 and 8' are located adjacent the upper ends of the seat back portions 5, respectively, and are aligned with each other in a lateral direction of the vehicle body 1. The reinforcement members 8 and 8', are, furthermore, aligned with respective upper end portions of the door structures 2 and 2'. In the event the automotive vehicle having the seat assemblies 3 and 3' thus arranged with the reinforcement members 8 and 8', respectively, encounters a sidewise crash so that the vehicle body 1 is caused to collapse laterally, the side door structures 2 and 2' are forced against the outer side walls of the seat back portions 5 of the seat assemblies 3 and 3', respectively, and attempt to collapse the seat back portions 5 also laterally. The forces thus applied to the seat back portions 5 from the side door structures 2 and 2', respectively, of the vehicle body 1 are, however, resisted by the rigid reinforcement members 8 and 8' in the seat cushion portions 5 of the seat assemblies 3 and 3'. The vehicle body 1 is, thus, impeded from being sidewise collapsed and protects the occupant or occupants of the seat assembly or assemblies from being critically injured.

In order that the reinforcement members 8 and 8' are able to function properly as safety means during a sidewise collision of a vehicle, it is of importance that the individual reinforcement members 8 and 8' be permitted to remain correctly aligned with each other between the side door structures 2 and 2' during the sidewise collision of the vehicle. If the seat back portion 5 of one of the two seat assemblies 3 and 3' happens to be held in an inclined position thereof with the seat back portion 5 of the other seat assembly held in an upright position thereof during a sidewise collision of the vehicle, the reinforcement members 8 and 8' might be misaligned with each other so that one of the reinforcement members 8 and 8' might fail to bear against the side door structure 2 or 2', respectively. For this reason, the seat assemblies 3 and 3' of the prior-art seat arrangement of the described nature are arranged so that the seat back portion 5 of each seat assembly is tiltable through an angle permitting each of the reinforcement members 8 and 8' to remain aligned with an upper end portion of each of the side door structures 2 and 2' and further with the other of the reinforcement members 8 and 8'. The result is that the seat back portion 5 of each seat assembly is tiltable through an angle which is practically of little significance for the comfort of an occupant of the seat assembly. The present invention contemplates provision of an improved vehicular seat arrangement which will overcome such a disadvantage of a prior-art seat arrangement of the described nature.

DESCRIPTION OF THE PREFERRED EMBODIMENTS

Figure 3:
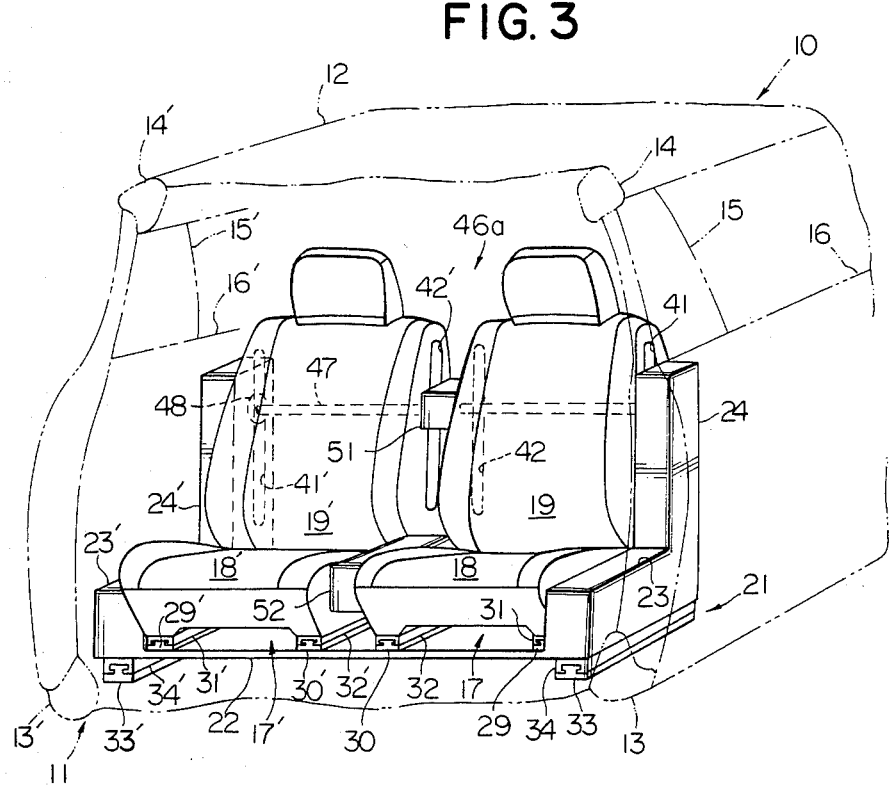
FIG. 3 is a perspective view showing a first preferred embodiment of a vehicular seat arrangement according to the present invention.

Referring to FIG. 3 of the drawings, a first preferred embodiment of a vehicular seat arrangement according to the present invention is shown provided in an automotive vehicle having a vehicle body schematically indicated at reference numeral 10. The vehicle body 10 is shown having a floor panel 11, a roof panel 12, a pair of side sills 13 and 13' extending along the side ends, respectively, of the floor panel 12 and a pair of roof side rails 14 and 14' extending along the side ends, respectively, of the roof panel 12 in fore-and-aft directions of the vehicle body 10. The vehicle body 10 is shown further having a pair of center pillars 15 and 15' vertically extending between the side sills 13 and 13' and the roof side rails 14 and 14', respectively, and a pair of rear side wall portions 16 and 16' provided at the rear of the center pillars 15 and 15', respectively, and a pair of front side door structures (not shown) provided in front of the center pillars 15 and 15', respectively. The side wall portions 16 and 16' may be respectively constituted by structural wall portions of the vehicle body as in an automotive vehicle of the two-door sedan type or by side door structures of an automotive vehicle of, for example, the four-door sedan type.

The seat arrangement provided in the vehicle body 10 thus constructed comprises a pair of seat assemblies 17 and 17' which are positioned side by side and spaced apart from each other laterally of the vehicle body, viz., between the side wall portions 16 and 16' of the vehicle body 10. As shown in FIG. 3 as well as FIG. 4, the seat assembly 17 has a horizontal seat cushion portion 18 and a seat back portion 19 upstanding from the rear end of the seat cushion portion 18 and having a head rest pad at the upper end thereof. Similarly, the seat assembly 17' has seat cushion and back portions 18' and 19' similar to their respective counterparts of the seat assembly 17. The seat back portion of each of the seat assemblies 17 and 17' is, furthermore, pivotally connected adjacent the lower end thereof to the rear end of the seat cushion portion of the seat assembly and is rockable with respect to the seat cushion portion about a pivotal axis fixed with respect to the seat cushion and seat back portions in a lateral direction of the vehicle body 10. Each of the seat back portions 19 and 19' is thus coupled to each of the seat cushion portions 18 and 18' by a pivot mechanism as shown in part at 20 in regard to the seat assembly 17 in FIG. 4. The pivot mechanism thus provided for each of the seat assemblies 17 and 17' permits the seat back portion of each seat assembly to tilt forwardly and backwardly between an upright first angular position and a downwardly inclined second angular position independently of the seat back portion of the other of the seat assemblies 17 and 17'.

Figure 5:
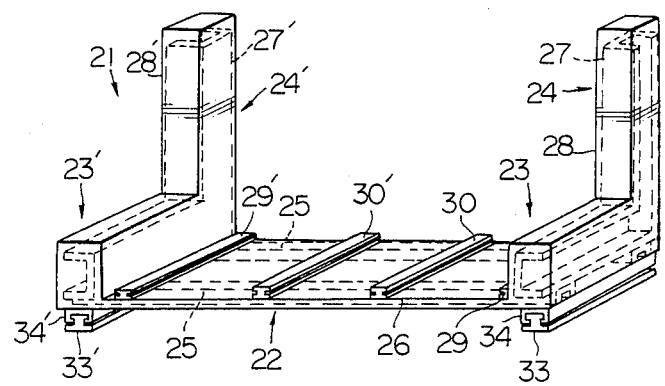
FIG. 5 is a perspective view showing a seat support structure forming part of the embodiment shown in FIG. 3.

The seat assemblies 17 and 17' are commonly mounted on a seat support structure 21 which comprises, as will be best seen from FIG. 5, a horizontal base plate portion 22, a pair of side arm portions 23 and 23' longitudinally extending along the side ends, respectively, of the base plate portion 22 in fore-and-aft directions of the vehicle body (FIG. 3) and spaced apart in parallel from each other laterally of the vehicle body, and a pair of vertical post portions 24 and 24' respectively upstanding from the rear ends of the side arm portions 23 and 23' and also spaced apart in parallel from each other laterally of the vehicle body. As will be seen from FIG. 3, the side arm portion 23 and vertical post portion 24 on one side of the seat support structure 21 are located inside one side wall portion 16 of the vehicle body 10 and, likewise, the side arm portion 23' and vertical post portion 24' on the other side of the seat support structure 21 are located inside the other side wall portion 16' of the vehicle body 10. Furthermore, the vertical post portions 24 and 24' upwardly terminate in the vicinity of the center pillars 15 and 15', respectively, as will also be seen from FIG. 3. As indicated by broken lines in FIG. 5, the base plate portion 22 of the seat support structure 21 is composed of rigid cross members 25 extending in lateral directions of the vehicle body 10 and spaced apart in parallel from each other in a fore-and-aft direction of the vehicle body, and a padded or soft covering 26 having the cross members 25 wrapped therein or covered therewith. On the other hand, the side arm portion 23 and vertical post portion 24 of the seat support structure 21 are composed of a unitary, generally L-shaped rigid member 27 having a U-shaped cross section and wrapped in or covered with a padded or soft covering 28. Likewise, the side arm portion 23' and vertical post portion 24' are composed of a unitary member 27' similar to the above mentioned rigid member 27. As shown in FIGS. 3 and 5, the seat support structure 21 further comprises elongated guide bars fixedly mounted on the upper face of the base plate portion 22 and consisting of a pair of guide bars 29 and 30 associated with one seat assembly 17 and a pair of guide bars 29' and 30' associated with the other seat assembly 17', the guide bars 29, 30, 29' and 30' longitudinally extending in fore-and-aft directions of the vehicle body 10. The guide bars 29 and 29' extend along and adjacent to the side arm portions 23 and 23', respectively, while the guide bars 30 and 30' are spaced apart in parallel laterally inwardly from the guide bars 29 and 29', respectively.

Figure 4:
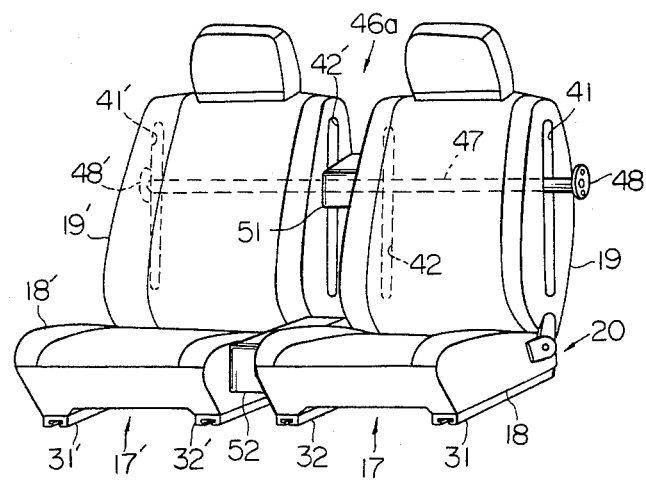
FIG. 4 is a perspective view of the combination of the seat assemblies in the embodiment shown in FIG. 3.

As shown in FIGS. 3 and 4, the seat assemblies 17 and 17' are carried on the pair of guide bars 29 and 30 and the pair of guide bars 29' and 30', respectively, by elongated, rigid slide bars secured to the seat cushion portions 18 and 18' of the seat assemblies 17 and 17' and consisting of a pair of slide bars 31 and 32 fixedly attached to the bottom surface portion of the seat cushion portion 18 of one seat assembly 17 and a pair of slide bars 31' and 32' fixedly attached to the bottom surface portion of the seat cushion portion 18' of the other seat assembly 17'. The slide bars 31 and 32 extend in fore-and-aft directions of the vehicle body 10 and are held in longitudinally slidable engagement with the guide bars 29 and 30, respectively, on the base plate portion 22 and, likewise, the slide bars 31' and 32' extend in fore-and-aft directions of the vehicle body 10 and are held in slidable engagement with the guide bars 29' and 30', respectively, on the base plate portion 22 as shown in FIG. 3. Thus, the seat assembly 17 is movable back and forth in a fore-and-aft direction of the vehicle body 10 on the guide bars 29 and 30 and, similarly, the seat assembly 17' is movable back and forth in a fore-and-aft direction of the vehicle body 10 on the guide bars 29' and 30'.

Figure 6:
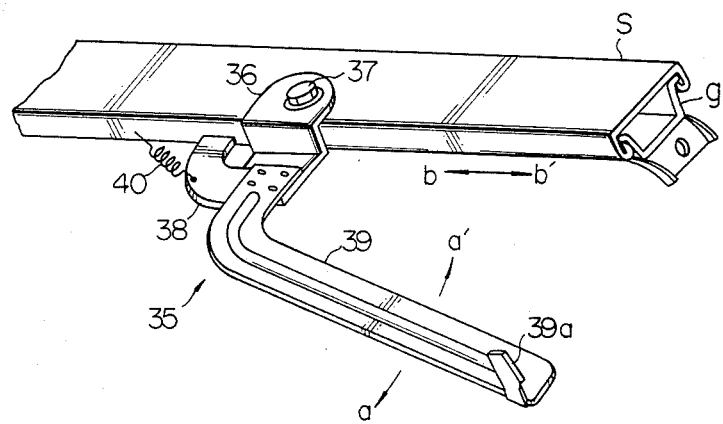
FIG. 6 is a fragmentary perspective view showing manually-operated drive means for each combination of guide and slide bars in the embodiment shown in FIG. 3.

The seat support structure 21 is, in turn, supported on the floor panel 11 by guide bars 33 and 33' and slide bars 34 and 34' extending in fore-and-aft directions of the vehicle body 10 as will be seen from FIG. 3. The guide bars 33 and 33' are fixedly attached to the upper face of the floor panel 11 and are located below the side arm portions 23 and 23', respectively, while the slide bars 34 and 34' are fixedly attached to the lower surfaces of side end portions, respectively, of the base plate portion 22. The slide bars 34 and 34' are held in longitudinally slidable engagement with the guide bars 33 and 33', respectively, so that the seat support structure 21 as a whole is movable back and forth over the floor panel 11 in a fore-and-aft direction of the vehicle body 10. Thus, each of the seat assemblies 17 and 17' carried on the guide bars 29, 30, 29' and 30' on the base plate portion 22 is movable back and forth in a fore-and-aft direction of the vehicle body 10 not only with respect to the seat support structure 21 but with respect to the floor panel 11. Each of the combinations of the guide and slide bars 29 and 31 and the guide and slide bars 30 and 32 and the combinations of the guide and slide bars 29' and 31' and the guide and slide bars 30' and 32' is provided with manually operated drive means to move the seat assembly over the base plate portion 22. Similar drive means is provided for each of the combinations of the guide and slide bars 33 and 34 and guide and slide bars 33' and 34' so as to move the seat support structure 21 and accordingly the seat assemblies 17 and 17' thereon over the floor panel 11. In FIG. 6, the guide and slide bars constituting each of the above mentioned combinations are represented by guide and slide bars g and s, respectively, and are provided with manually operated drive means 35. The drive means 35 comprises a swivel member 36 pivotally connected to the slide bar s by a pivot pin 37, and an arcuately curved cam member 38 arcuately extending from the swivel member 36 and engaging the guide bar g through a slot formed in the slide bar s. The drive means 35 further comprises a control lever 39 secured to and extending from the swivel member 36 and having a knob portion 39a, and a helical tension spring 40 anchored at one end to the cam member 38 and at the other end to the slide bar s. The tension spring 40 is adapted to urge the swivel member 36 and accordingly the control lever 39 to turn in a direction indicated by arrow a about the pin 37 so that the slide bar s and the guide bar g are locked by the cam member 38.

Figure 7:
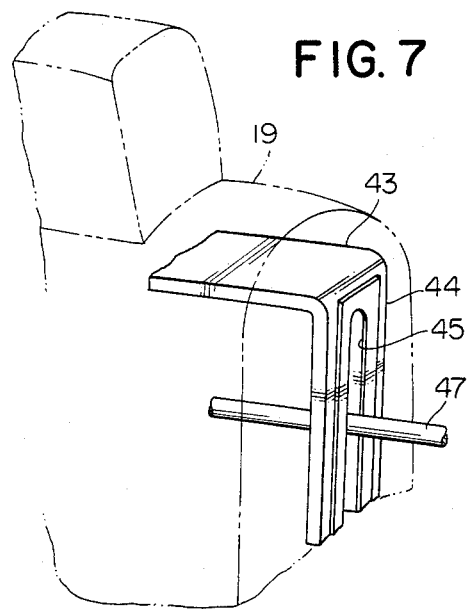
FIG. 7 is a fragmentary perspective view showing a portion of an internal frame structure in the seat back portion of each seat assembly in the embodiment of FIG. 3.

Turning back to FIGS. 3 and 4, the seat back portion 19 of the seat assembly 17 has formed in outer and inner side walls thereof vertically elongated slots 41 and 42, respectively, each extending between the lower and upper end portions of each side wall of the seat back portion 19. The seat back portion 19' of the seat assembly 17' has similar slots 41' and 42' formed in outer and inner side walls, respectively, thereof. The slots in the seat back portion of each of the seat assemblies 17 and 17' longitudinally extend approximately perpendicularly to the pivot axis about which the seat back portion is rockable with respect to the seat cushion portion of each of the seat assemblies 17 and 17'. Furthermore, the slots in the seat back portion of each seat assembly are aligned not only with each other laterally of each seat assembly but, when the seat back portions 19 and 19' are aligned with each other as shown in FIGS. 3 and 4, also with the slots in the seat back portion of the other of the seat assembly. As shown partially in FIG. 7, the seat back portion of each of the seat assemblies 17 and 17', herein represented by the seat assembly 17, has incorporated therein an internal seat back frame structure 43 having a pair of vertical side arm portions 44 (only one of which is shown in FIG. 7) respectively extending along and inside the opposite side walls of the seat back portion. The internal seat back frame structure 43 also has formed in these outer and inner side arm portions 44 vertically elongated slots 45, respectively, which are laterally aligned with the slots in the seat back portion of each of the seat assemblies 17 and 17'.

Figure 8:
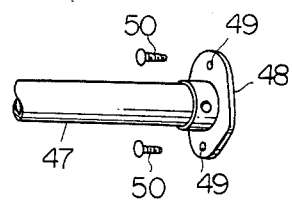
FIG. 8 is also a fragmentary perspective view showing a portion of a seat reinforcement member included in the embodiment illustrated in FIG. 3.

The first embodiment of the present invention further comprises a seat reinforcing device 46a as shown in FIGS. 3 and 4. The seat reinforcing device 46a comprises an elongated reinforcement member 47 which is preferably in the form of a tubular pipe as will be seen from FIG. 8. The reinforcement member 47 extends laterally of the vehicle body 10 through the slots 41 and 42 in the seat back portion 19 of the seat assembly 17, the slots 41' and 42' in the seat back portion 19' of the seat assembly 17' and the slots 45 in the internal frame structure 43 in each of the seat back portions 19 and 19' of the seat assemblies 17 and 17' as partially shown in FIG. 7 and through the gap between the seat back portions 19 and 19'. As shown in FIG. 4, the reinforcement member 47 has opposite axial end portions projecting outwardly from the slots 41 and 41' in the seat back portions 19 and 19', respectively, and is secured at both axial ends thereof to joint members 48 and 48', respectively, each formed with apertures 49 as shown in FIG. 8. The joint members 48 and 48' are fixedly attached to the inner faces of the vertical post portions 24 and 24', respectively, of the seat support structure 21 by suitable fastening means such as screws 50 (FIG. 8) respectively passed through the apertures 49 in each of the joint members 48 and 48'. The reinforcement member 47 thus longitudinally extends between the vertical post portions 24 and 24' of the seat support structure 21 laterally of the vehicle body 10 at a level slightly lower than the upper ends of the side wall portions 16 and 16' of the vehicle body 10 and has its opposite axial ends located in proximity to the center pillars 15 and 15', respectively, as will be seen from FIG. 3. If desired, an intermediate coupling block 51 may be provided which is loosely interposed between the seat back portions 19 and 19' of the seat assemblies 17 and 17' and securely mounted on an axially middle portion of the reinforcement member 47 as will be seen from FIGS. 3 and 4. Shown at 52 in FIGS. 3 and 4 is a console box which is provided between the seat cushion portions 18 and 18' of the seat assemblies 17 and 17'.

Figure 9:
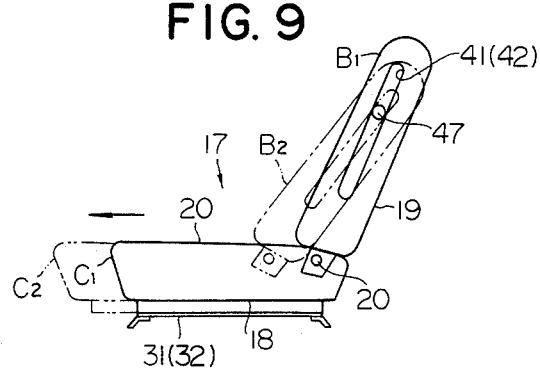
FIG. 9 is a side elevation view of each of the seat assemblies in the first preferred embodiment of a vehicular seat arrangement according to the present invention as shown in FIGS. 3 to 8, the seat assembly being shown having its seat cushion and back portions in different angular positions.

When, now, the control lever 39 connected to the slide bar s shown in FIG. 6 is manipulated at the knob portion 39a thereof and is manually driven to turn in a direction of arrow a' against the force of the tension spring 40, the cam member 38 permits the slide bar s and the guide bar g to be unlocked from each other so that the slide bar s is caused to longitudinally move on the guide bar g in a direction of arrow b or b'. If, in this instance, the slide bar s thus caused to move on the guide bar g is one of the slide bars 31 and 32 attached to the seat cushion portion 18 of the seat assembly 17 or one of the slide bars 31' and 32' attached to the seat cushion portion 18' of the seat assembly 17', then either the seat cushion portion 18 of the seat assembly 17 or the seat cushion portion 18' of the seat assembly 17' is caused to move on the guide bars 29 and 30 or the guide bars 29' and 30', respectively, on the base plate portion 22 of the seat support structure 21 (FIGS. 3 and 5). One of the seat cushion portions of the two seat assemblies such as the seat cushion portion 18 of the seat assembly 17 is therefore caused to move forwardly from a first longitudinal position $C_1$ indicated by full lines to a second longitudinal position $C_2$ indicated by dots-and-dash lines in FIG. 9 with respect to the seat support structure 21 which is held in situ with respect to the floor panel 11. As the seat cushion portion 18 of the seat assembly 17 is thus moved, the seat back portion 19 of the seat assembly 17 is caused to tilt downwardly and rearwardly from the upright first angular position $B_1$ as indicated by full lines toward the downwardly inclined second angular position $B_2$ thereof as indicated by dots-and-dash lines in FIG. 9. Similarly, the seat back portion 19' of the other seat assembly 17' can be caused to tilt downwardly and rearwardly from the upright first angular position $B_1$ to the downwardly inclined second angular position $B_2$ thereof as the seat cushion portion 18' is moved from the first longitudinal position $C_1$ to the second longitudinal position $C_2$ thereof on the base plate portion 22. The seat back portion of one of the seat assemblies 17 and 17' can thus be turned between the first and second angular positions $B_1$ and $B_2$, respectively, thereof independently of the seat back portion of the other seat assembly. As the seat back portion of each of the seat assemblies 17 and 17' is tilted between the first and second angular positions $B_1$ and $B_2$, respectively, thereof, the slots 41 and 42 in the seat back portion 19 of the seat assembly 17 or the slots 41' and 42' and accordingly the slots 45 (FIG. 7) in the internal frame structure 43 in the seat back portion 19 or 19' are angularly and longitudinally displaced with respect to the reinforcement member 47 which is held fixed to the post portions 24 and 24' of the seat support structure 21. When the seat back portion of one of the seat assemblies 17 and 17' is turned from the first angular position $B_1$ to the second angular position $B_2$ thereof with the seat back portion of the other seat assembly held in the first angular position $B_1$ thereof or, conversely, the seat back portion of one of the seat assemblies 17 and 17' is turned from the second angular position $B_2$ back to the first angular position $B_1$ thereof with the seat back portion of the other seat assembly left turned into the second angular position $B_2$ thereof, the seat back portions 19 and 19' of the seat assemblies 17 and 17' are brought out of alignment with each other laterally of the vehicle body 10. Since, however, the reinforcement member 47 is held fixed to the seat support structure 21, the reinforcement member 47 is maintained stationary with respect to the vehicle body 10 and is held in a position extending between the center pillars 15 and 15' or upper end portions of the side wall portions 16 and 16' of the vehicle body 10. If the vehicle is subjected to a sidewise crash under these conditions and, as a consequence, the side wall portions 16 and 16' of the vehicle body 10 are forced against the outer side walls of the seat back portions 19 and 19' of the seat assemblies 17 and 17', the reinforcement member 47 is enabled to resist the forces transmitted thereto through the vertical post portions 24 and 24' of the seat support structure 21. Such forces are borne and at least partially dampened by the reinforcement member 47 and the post portions 24 and 24', maintaining between the side wall portions 16 and 16' a space enough to protect the occupant or occupants of one or both of the seat assemblies 17 and 17' from being seriously injured.

If, on the other hand, the slide bar s caused to move on the guide bar g as previously discussed with reference to FIG. 6 is one or each of the slide bars 34 and 34' attached to the lower face of the base plate portion 22 of the seat support structure 21 as shown in FIG. 3, then the seat cushion portions 18 and 18' of both of the seat assemblies 17 and 17' are caused to move on the guide bars 33 and 33', respectively, on the floor panel 11. It therefore follows that the seat cushion portions 18 and 18' and the seat support structure 21 as a whole are caused to move forwardly over the floor panel 11. As the seat cushion portions 18 and 18' are thus moved, the seat back portions 19 and 19' of the seat assemblies 17 and 17' are caused to tilt downwardly and rearwardly. As the seat back portions 19 and 19' of each of the seat assemblies 17 and 17' is thus tilted, the slots 41 and 42 in the seat back portion 19, the slots 41' and 42' in the seat back portion 19' and accordingly the slots 45 (FIG. 7) in the internal frame structure 43 in each of the seat back portions 19 and 19' are also angularly and longitudinally displaced with respect to the reinforcement member 47 fixed to the post portions 24 and 24' of the seat support structure 21 which is forwardly moved over the floor panel 11. The reinforcement member 47 being thus held fixed to the seat support structure 21, the reinforcement member 47 still extends between the center pillars 15 and 15' or upper end portions of the side wall portions 16 and 16' of the vehicle body 10. If the vehicle is subjected to a sidewise crash under such conditions and, as a consequence, the side wall portions 16 and 16' are forced against the outer side walls of the seat back portions 19 and 19', the reinforcement member 47 is thus also enabled to resist the forces transmitted thereto through the vertical post portions 24 and 24'.

Figure 10:
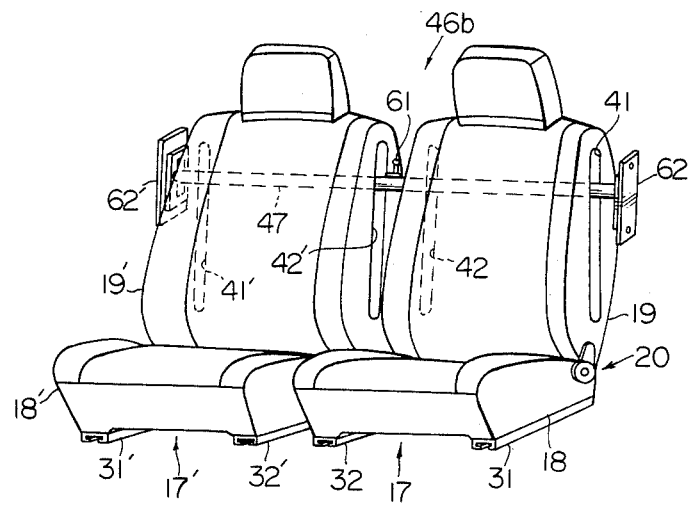
FIG. 10 is a perspective view of the combination of the seat assemblies in a second preferred embodiment of a vehicular seat arrangement according to the present invention.
Figure 11:
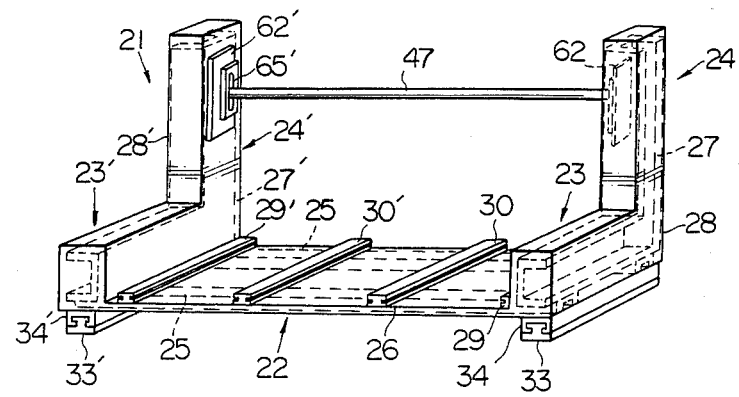
FIG. 11 is a perspective view showing a seat support structure forming part of the embodiment including the seat assemblies shown in FIG. 10.

Referring to FIGS. 10 to 16, particularly first to FIG. 10 of the drawings, a second preferred embodiment of a vehicular seat arrangement according to the present invention is largely similar to the first embodiment and comprises seat assemblies 17 and 17' supported on a seat support structure 21 which is also constructed similarly to its counterpart in the first embodiment as shown in FIG. 11. Each of the combinations of the slide bars 31 and 32, slide bars 31' and 32' and slide bars 34 and 34' is, thus, provided with manually operated drive means similar to the drive means 35 shown in FIG. 6. Thus, the two seat assemblies 17 and 17' in the second embodiment are movable forwardly and backwardly not only independently of each other with respect to the seat support structure 21 but concurrently with respect to the vehicle body as in the first embodiment. The seat arrangement of the second embodiment also has a seat reinforcing device which in its entirety is now designated by 46b. The seat reinforcing device 46b comprises an elongated reinforcement member 47 which extends in a lateral direction of the vehicle body (not shown) through the slots 41 and 42 in the seat back portion 19, the slots 41' and 42' in the seat back portion 19' and through the gap between the seat back portions 19 and 19'. As shown in FIG. 10, the reinforcement member 47 has opposite axial end portions projecting outwardly from the slots 41 and 41' in the seat back portions 19 and 19', respectively.

Figure 12:
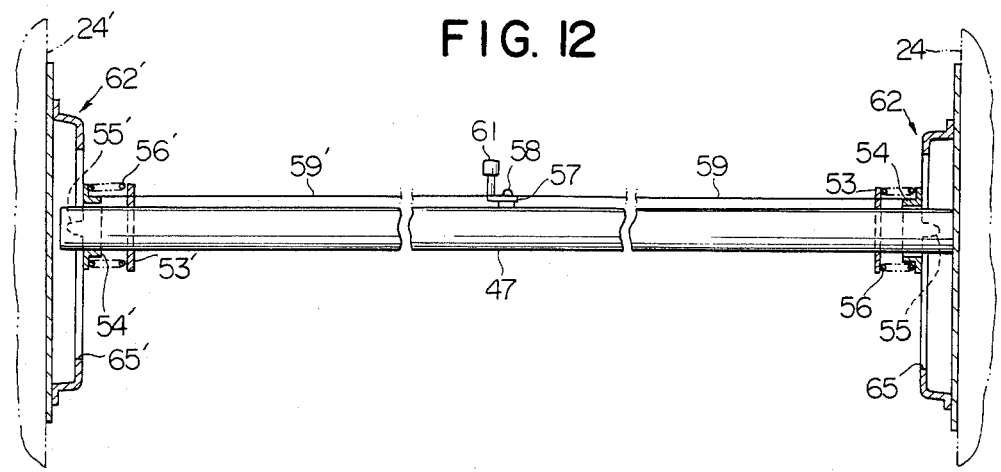
FIG. 12 is a fragmentary front view showing, partially in section, adjustable locking means in a seat reinforcing device of the second preferred embodiment of the present invention.
Figure 13:
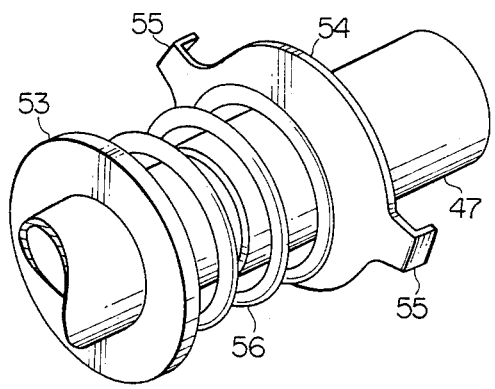
FIG. 13 is a fragmentary perspective view showing portions of the locking means illustrated in FIG. 12.

The embodiment shown in FIGS. 10 to 16 differs from the first embodiment of the present invention principally in that the seat arrangement having the reinforcement member 47 thus arranged is provided with adjustable locking means adapted for stepwise varying the vertical position of the reinforcement member 47 with respect to the seat back portions 19 and 19' of the seat assemblies 17 and 17'. Such locking means comprises a pair of annular spring seat flange members 53 and 53' which are securely mounted on opposite axial end portions, respectively, of the reinforcement member 47 and each of which is located at a suitable distance from each of the extreme axial ends of the reinforcement member 47 as will be seen from FIG. 12. As shown in FIG. 12, the adjustable locking means further comprises a pair of rigid locking members 54 and 54' which are slidable axially on the opposite axial end portions of the reinforcement member 47 toward and away from the flange members 53 and 53', respectively. Furthermore, the locking members 54 and 54' are axially spaced apart from the spring seat flange members 53 and 53', respectively, toward the extreme axial ends of the reinforcement member 47 as will be better seen from FIG. 13 in which the spring seat flange member 53 and the associated locking member 54 on only one axial end portion of the reinforcement member 47 are shown. As shown in FIG. 13 and also in FIG. 14, one locking member 54 has a pair of lug portions 55 which are diametrically opposite to each other across the center axis of the reinforcement member 47 and, likewise, the other locking member 54' has a pair of lug portions 55' respectively similar to the lug portions 55 of the locking member 54. The locking members 54 and 54' are urged to axially move away from the spring seat flange members 53 and 53', respectively, toward the extreme ends of the reinforcement member 47 by suitable biasing means. In FIG. 12, the biasing means is shown comprising a helical compression spring 56 coaxially wrapping one axial end portion of the reinforcement member 47 and seated at one end on the spring seat flange member 53 and at the other end on the locking member 54 as shown in FIGS. 13 and 14 and a helical compression spring 56' coaxially wrapping another axial end portion of the reinforcement member 47 and seated between the spring seat flange member 53' and the locking member 54' as will be seen from FIG. 12. The spring seat flange members 53 and 53', locking members 54 and 54' and helical compression springs 56 form part of the previously mentioned adjustable locking means for the reinforcement member 47.

The seat reinforcing device 46b further comprises manually operated lock adjusting means for manually moving the locking members 54 and 54' concurrently toward the spring seat flange members 53 and 53' against the forces of the compression springs 56 and 56', respectively, when desired. In FIGS. 12 and 14, such lock adjusting means is shown comprising an elongated control lever 57 which has a middle fulcrum portion pivotally connected to an axially middle portion of the reinforcement member 47 by a pivot pin 58 perpendicular to the center axis of the reinforcement member 47. The control lever 57 has a pair of end portions extending in opposite directions from the above mentioned fulcrum portion of the lever 57. A steel wire 59 is anchored at one end to one end portion of the control lever 57 and at the other end to the locking member 54 on one axial end portion of the reinforcement member 47 and is thereby stretched under tension between the locking member 54 and the control lever 57 and, likewise, a steel wire 59' is anchored at one end to the other end portion of the control lever 57 and at the other end to the locking member 54' on the other axial end portion of the reinforcement member 47 and is thus tautly stretched between the locking member 54 and the lever 57 as shown in FIG. 12 by the forces exerted on the locking members 54 and 54' by the springs 56 and 56', respectively. Each of the steel wires 59 and 59' herein shown is a representative example of a flexible line which may thus be constituted by another form of flexible cordage element. The lock adjusting means further comprises an arm member 60 securely connected to the above mentioned fulcrum portion of the control lever 57 and angularly movable with the lever 57. A control knob 61 is secured to the arm member 60 as shown.

The adjustable locking means of the seat reinforcing device 46b further comprises bracket members 62 and 62' each formed with apertures 63 as shown in FIG. 14. The bracket members 62 and 62' are securely attached by suitable fastening means to the inner faces of the vertical post portions 24 and 24' of the seat support structure 21 as shown in FIG. 11. As will be seen from FIG. 14, such fastening means are herein assumed as including screws 64 which are respectively passed through the apertures 63 in each bracket member. As shown in FIG. 12, the bracket members 62 and 62' are formed with elongated slots 65 and 65', respectively, each extending vertically along each of the post portions 24 and 24' of the seat support structure 21 as will be seen more clearly from FIG. 14 in which only the slot 65 formed in the bracket member 62 is shown. The slots 65 and 65' in the bracket members 62 and 62' are aligned with each other laterally of the vehicle body.

As also shown in FIG. 14, each of the bracket members 62 and 62' is further formed with a plurality of pairs of openings including, downwardly of each bracket member, a first pair of openings 66a, a second pair of openings 66b (only one of which is seen in FIG. 14), a third pair of openings 66c, and so forth. Each pair of openings are located on both sides of the elongated slot 65 in each of the bracket members 62 and 62' and the plurality of pairs of openings 66a, 66b, 66c and so forth are located at different vertical levels with respect to each of the vertical post portions 24 and 24' (FIG. 11). Furthermore, the pairs of openings 66a, 66b, 66c and so forth in one of the bracket members 62 and 62' are respectively aligned with their respective counterparts in the other bracket member in lateral directions of the vehicle body. The opposite axial end portions of the reinforcement member 47 project into the bracket members 62 and 62', respectively, through the elongated slots 65 in the bracket members with the lug portions 55 of one locking member 54 received in a selected pair of openings 66a, 66b, 66c, . . . by the force of the associated spring 56 and the lug portions 55' of the other locking member 54' received in the pair of openings aligned with the selected pair of openings in the locking member 54. The bracket members 62 and 62' also form part of the previously mentioned adjustable locking means.

The steel wires 59 and 59' are equally tensioned by the forces exerted on the locking levers 54 and 54' by the springs 56 and 56', respectively. When the control knob 61 is free from a manipulative turning effort, the control lever 57 is thus forced to stay in a neutral angular position on the reinforcement member 47 by the tensions in the wires 59 and 59' so that the locking members 54 and 54' are urged away from the spring seat flange members 53 and 53', respectively, by the equal forces of the springs 56 and 56'. In FIG. 14, the locking member 54 on one axial end portion of the reinforcement member 47 is shown having its lug portions 55 received in the second pair of openings 66b by way of example and, thus, the locking member 54' on the other axial end portion of the reinforcement member 47 is assumed to have its lug portion 55' also received in the second pair of openings in the bracket member 62' so that the reinforcement member 47 extends horizontally or in parallel with the base plate portion 22 of the seat support structure 21 shown in FIG. 11.

When, now, either the seat assembly 17 or the seat assembly 17' is caused to forwardly move on the guide bars 29 and 30 or the guide bars 29' and 30', respectively, (FIG. 11), the seat cushion portion of one of the seat assemblies such as the seat cushion portion 18 of the seat assembly 17 is caused to move forwardly from a first longitudinal position $C_1$ indicated by full lines to a second longitudinal position $C_2$ indicated by dots-and-dash lines in FIG. 15 over the base plate portion 22 of the seat support structure 21 which is held in situ with respect to the floor panel of the vehicle body. As the seat cushion portion 18 of the seat assembly 17 is thus moved, the seat back portion 19 is caused to tilt downwardly and rearwardly from the upright first angular position $B_1$ as indicated by full lines toward the downwardly inclined second angular position $B_2$ as indicated by dots-and-dash lines in FIG. 15. Similarly, the seat back portion 19' of the other seat assembly 17' can be caused to tilt downwardly and rearwardly from the upright first angular position $B_1$ to the downwardly inclined second angular position $B_2$ as the seat cushion portion 18' is moved from the first longitudinal position $C_1$ to the second longitudinal position $C_2$ thereof. The seat back portion of each of the seat assemblies 17 and 17' can thus be turned between the first and second angular positions $B_1$ and $B_2$, respectively, thereof independently of the seat back portion of the other seat assembly as in the first embodiment of the present invention. If, on the the other hand, the seat support structure 21 is caused to forwardly move on the floor panel 11 of the vehicle body 10, the seat cushion portions 18 and 18' of both of the seat assemblies 17 and 17' are caused to move forwardly together with the seat support structure 21 with respect to the floor panel 11. As the seat cushion portions 18 and 18' are thus moved, the seat back portions 19 and 19' of the seat assemblies 17 and 17' are caused to tilt downwardly and rearwardly also from the upright first angular positions $B_1$ toward the downwardly inclined second angular positions $B_2$ thereof.

If, now, the control knob 61 of the previously mentioned adjustable locking means (FIGS. 12 to 14) is manipulated to turn about the pivot pin 58 on the reinforcement member 47, the control lever 57 is driven to turn also about the pin 58 in a direction to pull the steel wires 59 and 59' from the locking members 54 and 54', respectively, on the reinforcement member 47. The result is that the locking members 54 and 54' are caused to axially move toward the associated spring seat flange members 53 and 53', respectively, against the forces of the springs 56 and 56' acting on the locking members 54 and 54', respectively. This causes the lug portions 55 and 55' of the locking members 54 and 54' to be removed from the second pairs of openings 66b in the bracket members 62 and 62', respectively. The locking members 54 and 54' are thus disengaged from the bracket members 62 and 62', respectively, and are ready to have their lug portions 55 and 55' received in the other pairs of openings in the bracket member 62 and 62', respectively. For convenience sake, it is herein assumed that the lug portions 55 and 55' of the locking members 54 and 54' removed from the second pairs of openings in the bracket members 62 and 62', respectively, as above noted are thereafter inserted into the third pairs of openings 66c in the bracket members 62 and 62'. As a consequence, the reinforcement member 47 which has been held in a horizontal position level with the second pair of openings 66b in the bracket member 62 is in its entirety moved to a horizontal position level with the third pair of openings 66c in the bracket members 62 and 62' and is lowered in the vehicle body 10. If, under these conditions, either the seat assembly 17 or the seat assembly 17' is caused to forwardly move on the guide bars 29 and 30 or the guide bars 29' and 30', respectively, on the base plate portion 22 (FIG. 11), the seat cushion portion of one of the seat assemblies such as the seat cushion portion 18 of the seat assembly 17 is caused to move forwardly from the first longitudinal position $C_1$ indicated by full lines to a third longitudinal position $C_3$ indicated by dots-and-dash lines in FIG. 16 over the base plate portion 22 which is held in situ with respect to the floor panel 11 of the vehicle body 10. As the seat cushion portion 18 of the seat assembly 17 is moved from the first longitudinal position $C_1$ to the third longitudinal position $C_3$, the seat back portion 19 of the seat assembly 17 is caused to tilt downwardly and rearwardly from the upright first angular position $B_1$ as indicated by full lines toward a downwardly inclined third angular position $B_3$ as indicated by dots-and-dash lines in FIG. 16. Similarly, the seat back portion 19' of the other seat assembly 17' can be caused to tilt from the upright first angular position $B_1$ to the downwardly inclined third angular position $B_3$ thereof as the seat cushion portion 18' is moved from the first longitudinal position $C_1$ to the third longitudinal position $C_3$ thereof. In this fashion, the seat back portion of each of the seat assemblies 17 and 17' can be turned between the first and third angular positions $B_1$ and $B_3$, respectively, thereof with respect to the floor panel 11 independently of the seat back portion of the other of the seat assemblies 17 and 17'. If, on the the other hand, the seat support structure 21 is caused to forwardly move on the floor panel 11 of the vehicle body 10, the seat cushion portions 18 and 18' of both of the seat assemblies 17 and 17' are caused to move forwardly together with the seat support structure 21 with respect to the floor panel 11. As the seat cushion portions 18 and 18' are thus moved, the seat back portions 19 and 19' of the seat assemblies 17 and 17' are caused to tilt further downwardly and rearwardly also from the upright first angular positions $B_1$ toward the downwardly inclined third angular positions $B_3$ thereof.

As the seat back portion of each of the seat assemblies 17 and 17' is tilted between the first and third angular positions $B_1$ and $B_3$, respectively, thereof, the the upper ends of the slots approach the reinforcement member 47 or, in other words, the reinforcement member 47 which per se is held stationary with respect to the vehicle body 10 approaches the upper ends of the slots 41 and 42 or the slots 41' and 42' in the seat back portion 19 or 19'. Thus, the reinforcement member 47 is permitted to move a longer distance through the slots 41 and 42 or the slots 41' and 42' when the locking members 54 and 54' on the reinforcement member 47 are held engagement with the bracket members 62 and 62' through the third pairs of openings 66c in the bracket members than the reinforcement member 47 is permitted to move through the slots 41 and 42 or the slots 41' and 42' when the locking members 54 and 54' are held engagement with the bracket members 62 and 62' through the second pairs of openings 66b located closer to the upper ends of the slots 65 and 65'. Thus, the longer the distance which the reinforcement member 47 is permitted to move through the slots 41 and 42 in the seat back portion 19 or the slots 41' and 42' in the seat back portion 19', the more is the seat back portion 19 or 19' of the seat assembly 17 or 17' inclined from the first angular position $B_1$ thereof with respect to the seat cushion portion 18 or 18' of the seat assembly. The embodiment of the present invention as hereinbefore described with reference to FIGS. 6 to 10 is for this reason characterized, over the first embodiment of the present invention, in that the seat back portion of each of the seat assemblies 17 and 17' is enabled to tilt through an increased angle.

FIG. 17 of the drawings shows a fifth preferred embodiment of the present invention. The third embodiment of the present invention is also largely similar to each of the first to third embodiments of the present invention as hereinbefore described but is different from each of such embodiments firstly in that the seat cushion portions 18 and 18' of the two seat assemblies 17 and 17' are carried on the floor panel 11 without the aid of the seat support structure 21 used in each of the hereinbefore described embodiments of the present invention. Thus, the guide bars 29 and 30 respectively engaged by the slide bars 31 and 32 attached to the bottom surface of the seat assembly 17 and the guide bars 29' and 30' respectively engaged by the slide bars 31' and 32' attached to the bottom surface of the seat assembly 17' are directly secured to the upper face of the floor panel 11. In the seat arrangement of the nature above described, both of the seat assemblies 17 and 17' can not be moved as a single unit with respect to the floor panel 11. The seat arrangement shown in FIG. 17 is further characterized by a seat reinforcing device 46e in which the reinforcement member 47 is fixedly secured at the opposite axial ends thereof to suitable stationary structural members such as the center pillars 15 and 15', respectively. In this instance, it is preferable that suitable pad blocks 91 and 91' be provided, one between one center pillar 15 and the outer side wall of the seat back portion 19 of one seat assembly 17 and the other between the other center pillar 15' of the vehicle body and the outer side wall of the seat back portion 19 of the other seat assembly 17 as shown. Furthermore, an intermediate pad block 51 is interposed between the respective inner walls of the seat back portions 19 and 19' of the seat assemblies 17 and 17' and securely mounted on an axially middle portion of the reinforcement member 47 as in the embodiment of FIGS. 3 to 9.

Figure 18:
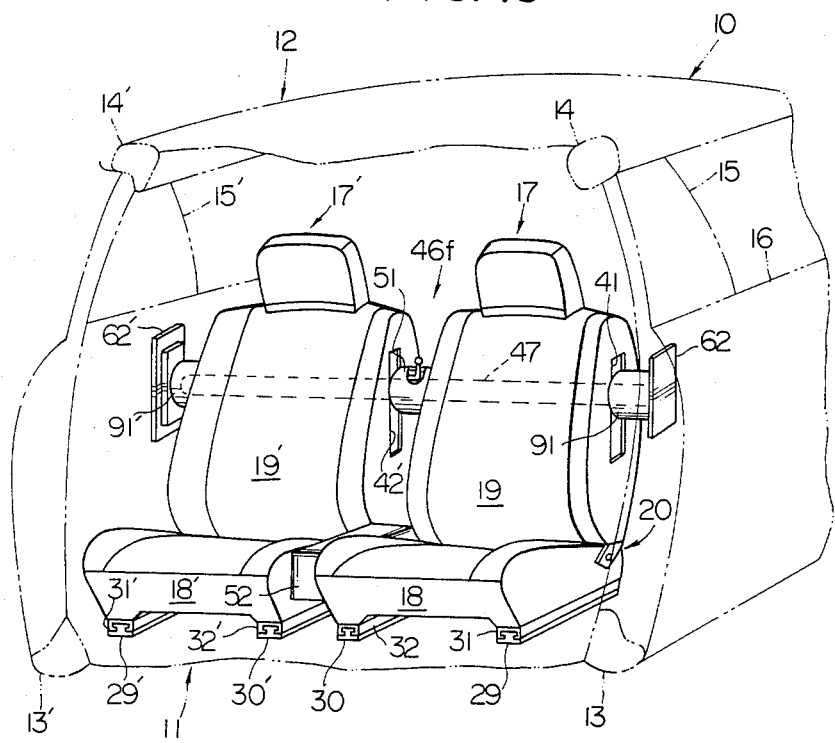

In FIG. 18 of the drawings is shown a fourth preferred embodiment of the present invention. The embodiment herein shown is basically similar to the above described embodiment of FIG. 17 but differs therefrom in that the seat arrangement shown in FIG. 18 has a seat reinforcing device 46f provided with adjustable locking means similar to the adjustable locking means in the second embodiment. The reinforcement member 47 being thus securely but adjustably fitted to the bracket members 62 and 62' as in the second embodiment, the reinforcement member 47 forming part of the seat reinforcing device 46f is maintained in a selected vertical position longitudinally extending between upper end portions of the side wall portions 16 and 16' or the center pillars 15 and 15' of the vehicle body 10. The fourth embodiment of the present invention is thus characterized, over the third embodiment of the present invention, in that the seat back portion of each of the seat assemblies 17 and 17' is enabled to tilt through an increased angle about the pivotal axis between the seat cushion and back portions of the seat assembly.

Figure 19:
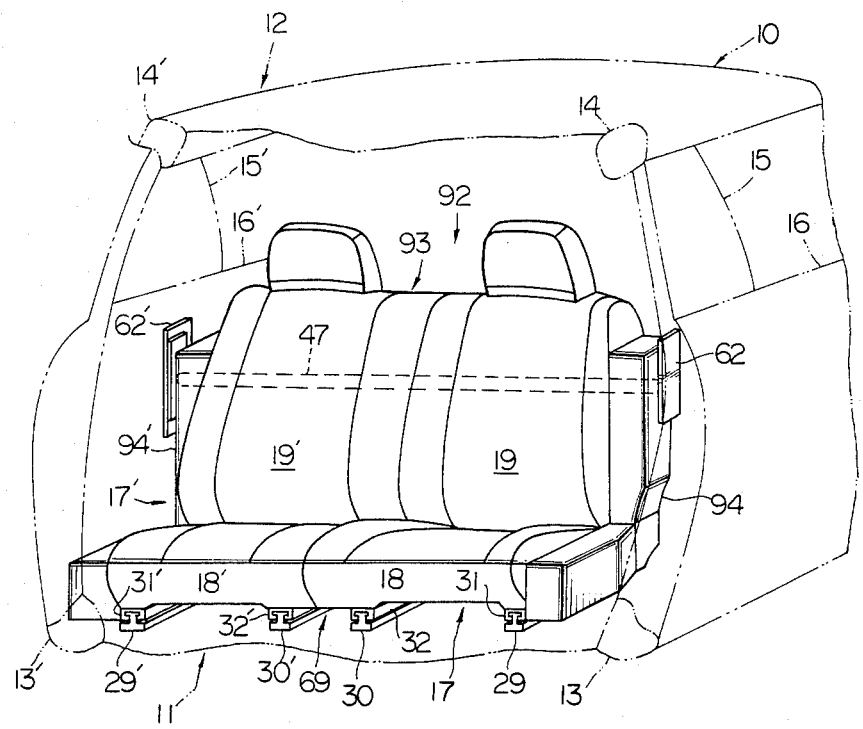

Turning to FIG. 19 of the drawings, there is shown a fifth preferred embodiment of the the present invention. The embodiment herein shown is basically similar to the above described embodiment shown in FIG. 17 except in that the seat assemblies 17 and 17' are constructed by a single unitary seat structure 92. Thus, the seat structure 92 of the embodiment of FIG. 19 not only has its seat cushion portions 18 and 18' constituted by a unitary seat cushion structure 69 but has its seat back portions 19 and 19' constituted by a unitary seat back structure 93. Furthermore, the seat arrangement illustrated in FIG. 19 is characterized in that a pair of vertically elongated pad blocks 94 and 94' are provided on both sides of the seat back portions 19 and 19' constituted by the unitary seat back structure 93. The two pad blocks consist of a pad block 94 interposed between one center pillar 15 or one side wall portion 16 of the vehicle body 10 and the outer side wall of the unitary seat cushion structure 93 and a pad block 94' interposed between the other center pillar 15' or the side wall portion 16' and the outer side wall of the unitary seat back structure 93 as shown. If desired, the seat arrangement shown in FIG. 19 may be further provided with adjustable locking means similar to such means provided in the embodiment of FIGS. 10 to 16. In this instance, the bracket members 62 and 62' forming part of such adjustable locking means are securely attached to the center pillars 15 and 15' or the side wall portions 16 and 16', respectively, of the vehicle body 10.

What is claimed is:

1. A vehicular seat arrangement for use in an automotive vehicle having a vehicle body including a floor panel and a pair of side wall portions, comprising
at least two seat assemblies positioned on the floor panel in parallel with each other laterally of the vehicle body, each of the seat assemblies having a seat cushion portion positioned over and in parallel to the floor panel and a seat back portion upstanding from the seat cushion portion and rockable with respect to the seat cushion portion about a pivot axis in a lateral direction of the seat assembly,
a seat reinforcing device including an elongated reinforcement member longitudinally extending in a lateral direction of the vehicle body between said side wall portions and passed in part through the seat back portion of one of said seat assemblies and in part through the seat back portion of the other of the seat assemblies, and
tilt regulating means permitting the seat back portion of one of said seat assemblies to tilt with respect to the seat cushion portion of the seat assembly about said pivot axis independently of the seat back portion of the other of the seat assemblies.

2. A vehicular seat arrangement as set forth in claim 1, in which said reinforcement member is parallel in part with said pivot axis, and in which said tilt regulating means comprises (1) guide and slide members provided between said floor panel and each of said seat assemblies for permitting said seat assemblies to move over said floor panel in a fore-and-aft direction of the vehicle body and (2) opposite side walls of the seat back portion of at least one of the seat assemblies, said side walls being respectively formed with elongated slots extending perpendicularly toward said pivot axis, said reinforcement member longitudinally extending through said slots for permitting the seat back portion of said one of the seat assemblies to turn about the reinforcement member with respect to said vehicle body and to tilt with respect to the seat cushion portion of the seat assembly about said pivot axis independently of the seat back portion of the other of the seat assemblies as the seat cushion portion of said one of the seat assemblies is moved with respect to said floor panel in said fore-and-aft direction of the vehicle body.

3. A vehicular seat arrangement as set forth in claim 1, in which said reinforcement member is parallel in part with said pivot axis, and in which said tilt regulating means comprises (1) guide and slide members provided between said floor panel and each of said seat assemblies for permitting said seat assemblies to move over said floor panel in a fore-and-aft direction of the vehicle body and (2) opposite side walls of the seat back portion of each seat assembly, said side walls being respectively formed with elongated slots longitudinally extending perpendicularly toward said pivot axis, said reinforcement member longitudinally extending through the slots in the seat back portion of each of the seat assemblies for permitting the seat back portion of each of the seat assemblies to turn about the reinforcement member with respect to said vehicle body and to tilt with respect to the seat cushion portion of the seat assembly about said pivot axis independently of the seat back portion of the other of the seat assemblies as the seat cushion portion of at least one of the seat assemblies is moved with respect to said floor panel in said fore-and-aft direction of the vehicle body.

4. A vehicular seat arrangement as set forth in claim 3, in which said guide and slide members include (a) at least a pair of guide bars fixedly attached to the floor panel and longitudinally extending in fore-and-aft directions of the vehicle body, and (b) at least a pair of slide bars longitudinally slidable on said guide bars, respectively, and each movable with the seat cushion portion of each of said seat assemblies.

5. A vehicular seat arrangement as set forth in claim 3, in which said tilt regulating means further comprises (3) a seat support structure having a base plate portion positioned over and parallel with said floor panel and having said seat assemblies carried thereon, and in which said guide and slide members include (a) at least a pair of guide bars fixedly attached to the floor panel and longitudinally extending in fore-and-aft directions of the vehicle body, and (b) at least a pair of slide bars fixedly attached to the base plate portion of said seat support structure and longitudinally slidable on said guide bars, respectively.

6. A vehicular seat arrangement as set forth in claim 3, in which said tilt regulating means further comprises (3) a seat support structure having a base plate portion positioned over and parallel with said floor panel and having said seat assemblies carried thereon the base plate portion of the seat support structure having upper and lower surfaces, and in which said guide and slide members include (a) at least a pair of guide bars fixedly attached to the floor panel and longitudinally extending in fore-and-aft directions of the vehicle body, (b) at least a pair of slide bars fixedly attached to the lower surface of the base plate portion of said seat support structure and longitudinally slidable on said guide bars, respectively, (c) at least two pairs of guide bars fixedly attached to the upper surface of said base plate portion of said seat support structure and longitudinally extending in fore-and-aft directions of the vehicle body, and (d) at least two pairs of slide bars longitudinally slidable on the guide bars on the upper surface of the base plate portion of said seat support structure, respectively, each pair of slide bars slidable on the guide bars on the upper surface of said base plate portion being fixedly attached to the seat cushion portion of each of said seat assemblies.

7. A vehicular seat arrangement as set forth in claim 3, in which said guide and slide members include (a) at least two pairs of guide bars fixedly attached to said floor panel and longitudinally extending in fore-and-aft directions of the vehicle body, and (b) at least two pairs of slide bars longitudinally slidable on said guide bars, respectively, each pair of slide bars being fixedly attached to the seat cushion portion of each of said seat assemblies.

8. A vehicular seat arrangement as set forth in any one of claims 1 to 7, in which said seat assemblies are constructed separately of and laterally spaced apart from each other, and in which said seat reinforcing device further comprises a coupling block interposed between the respective seat back portions of said seat assemblies and securely mounted on an axially middle portion of said reinforcement member.

9. A vehicular seat arrangement as set forth in claims 5 or 6, in which said reinforcement member is securely connected at the opposite axial ends thereof to said seat support structure.

10. A vehicular seat arrangement as set forth in claims 5 or 6, in which said seat reinforcing device further comprises a pair of pad blocks through which said reinforcement member is securely connected at the opposite axial ends thereof to the vehicle body.

11. A vehicular seat arrangement as set forth in any one of claims 5 to 7, in which said seat reinforcing device further comprises adjustable locking means for stepwise varying the vertical position of the reinforcement member with respect to the seat back portions of said seat assemblies, said locking means comprising (1) a pair of flange members which are securely mounted on opposite axial end portions, respectively, of the reinforcement member and each of which is located at a distance from each of the extreme axial ends of the reinforcement member, (2) a pair of locking members slidable axially on the opposite axial end portions of the reinforcement member toward and away from said flange members, respectively, (3) biasing means urging said locking members to axially move away from the flange members, respectively, toward the extreme axial ends of the reinforcement member, and (4) a pair of bracket members fixedly located adjacent said side wall portions, respectively, each of the bracket members being formed with a plurality of openings arranged in a vertical direction in the vehicle body, the openings in one of the bracket members being aligned with the openings, respectively, in the other bracket member in lateral directions of the vehicle body, the opposite axial end portions of said reinforcement member being detachably fitted to said bracket members, respectively, through a selected one of the openings in one of the bracket members and a selected one of the openings in the other bracket member.

12. A vehicular seat arrangement as set forth in claim 11, in which said bracket members are formed with elongated slots, respectively, aligned with each other laterally of the vehicle body, the openings in each of said bracket members being arranged along the slot in the bracket member and each of said opposite axial end portions of said reinforcement member axially extending through the slot in the bracket member.

13. A vehicular seat arrangement as set forth in claim 12, in which said seat reinforcing device further comprises manually operated lock adjusting means for moving the locking members concurrently toward said flange members against the force of said biasing means, the lock adjusting means comprising (1) a control lever pivotally connected to an axially middle portion of the reinforcement member and having a pair of end portions extending in opposite directions from the axis about which the control lever is rockable with respect to the reinforcement member, and (2) a pair of fixible lines each stretched under tension between each of said end portions of the control lever and each of said locking members.

14. A vehicular seat arrangement as set forth in claim 11, in which said bracket members are fixedly attached to said seat support structure.

15. A vehicular seat arrangement as set forth in claim 11, in which said bracket members are fixedly attached to said side wall portions, respectively, of the vehicle body.

16. A vehicular seat arrangement as set forth in claim 11, in which said seat assemblies are constructed separately of and laterally spaced apart from each other.

17. A vehicular seat arrangement as set forth in claim 11, in which said seat assemblies are integral with each other.

18. A vehicular seat arrangement as set forth in claim 11, in which said seat reinforcing device further comprises a pair of pad blocks through which said reinforcement member is securely connected at the opposite axial ends thereof to the vehicle body.

* * * * *